UNITED STATES PATENT OFFICE.

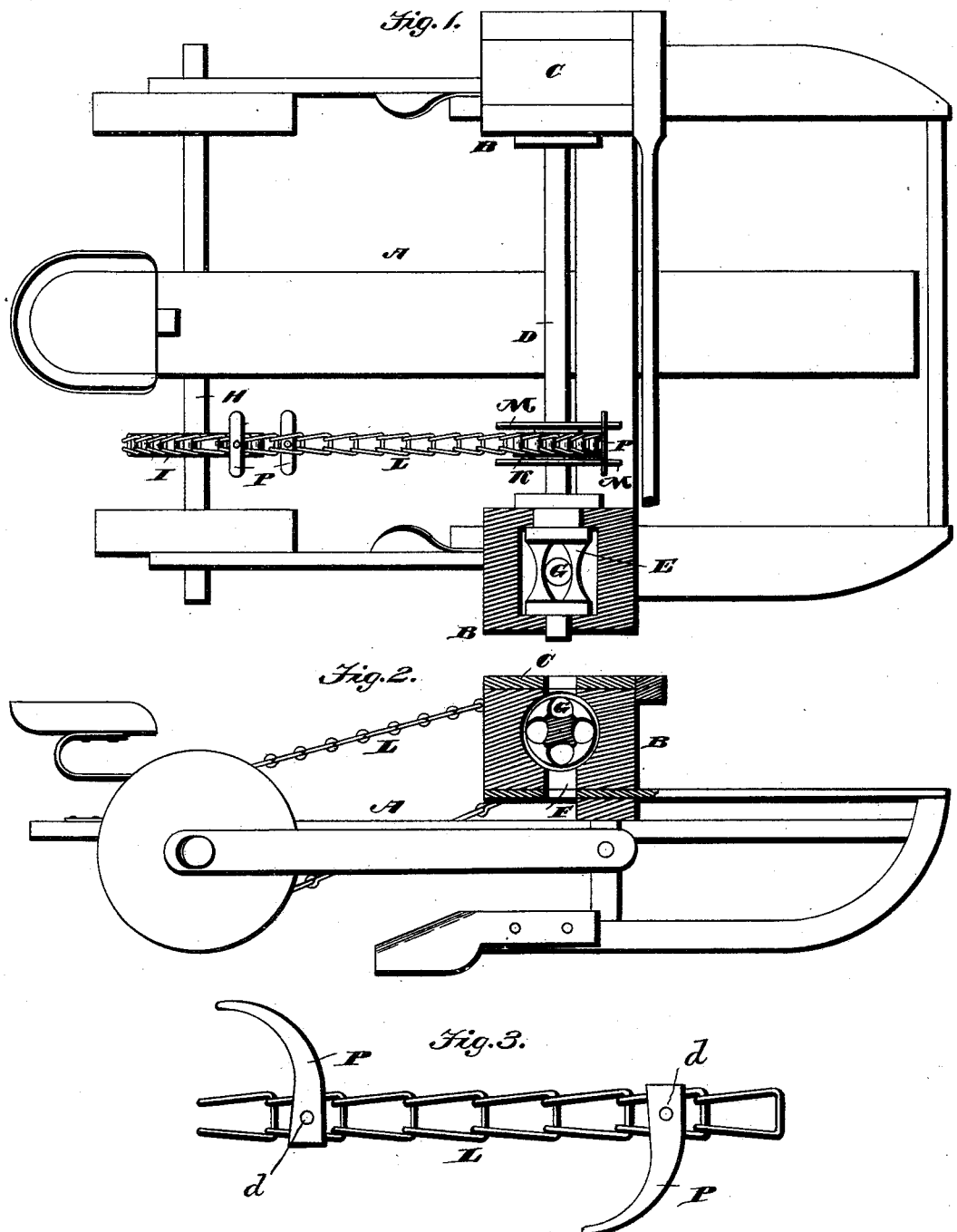

GEORGE J. CLINE, OF GOSHEN, INDIANA.

CORN-PLANTER.

SPECIFICATION forming part of Letters Patent No. 407,168, dated July 16, 1889.

Application filed February 7, 1889. Serial No. 299,044. (No model.)

*To all whom it may concern:*

Be it known that I, GEORGE J. CLINE, a citizen of the United States, residing at Goshen, in the county of Elkhart and State of Indiana, have invented certain new and useful Improvements in Corn-Planters; and I do declare the following to be a full, clear, and exact description of the invention, such as will enable others skilled in the art to which it appertains to make and use the same.

This invention relates to improvements in planters—such as corn, cotton, and bean planters; and it has for its object to improve the dropping mechanism, as will be hereinafter more fully set forth and claimed.

The invention will be fully understood from the following description, when taken in connection with the annexed drawings, in which—

Figure 1 is a plan view of the main parts of a planter, showing one of the seed-boxes in section and my improvements applied. Fig. 2 is a side elevation of the same with the seed-box in vertical section, showing the rotary dropper therein. Fig. 3 is a view of a modification to show the dropping mechanism which I employ on a shaker or reciprocating planter, and Fig. 4 is a perspective view of one of the triggers removed from the endless chain.

Referring by letter to the said drawings, A indicates the main frame of a seed-planter, which may be of any ordinary or approved construction, having the usual shoes and coverers and the rear supporting and driving wheels.

B indicates the seed-boxes, above which may be placed a suitable hopper, and C is a slide for regulating the discharge of the seed into the boxes B.

D indicates a rotary shaft arranged transversely in the main frame and having its opposite ends provided with rotary droppers E. These droppers, which are secured to the shaft D and arranged within the boxes B, which have a discharge-aperture F, are provided with any number of cups G, so that as the shaft rotates the seed will be received into the cups and discharged into the furrow at regular intervals.

H indicates the rear axle, which has secured to it a sprocket-wheel I, so that it may rotate therewith.

Secured to the axle D or seed-shaft is a sprocket-wheel K, and over these wheels pass an endless belt or chain L. The wheel K of the seed-shaft or the shaft itself is provided with arms or triggers M, which extend sufficiently beyond the plane of the periphery of said roller to be engaged by triggers on the endless chain or belt, as will be presently described.

In Fig. 1 of the drawings I have shown triggers M, arranged one on each side of the wheels K, and the endless chain provided with triggers P, which extend from opposite sides of said chain, so that both extended branches may engage the triggers fixed to the seed-shaft or its wheels during travel and impart an intermittent rotary motion to the seed cups or droppers. It is obvious that these triggers may be secured to the links of the chain or to a belt in any suitable manner and arranged at intervals thereon, according to the number of cups in the seed-rollers and at the distances at which it is desired to deposit the grain.

In applying my improved dropping mechanism to a shaking or reciprocating planter I have the triggers of the chain arranged to extend on opposite sides thereof alternately, and I prefer to curve the triggers, as shown in Figs. 3 and 4. These triggers may be secured to a chain or belt by forming a loop in their inner end, as better shown in Fig. 4, and passing a rivet or other fastening device through the hole $a$ therein. By this means they may be readily removed when injured and replaced by others.

It is obvious that when using my improved dropping mechanism on a shaker-planter the triggers on the seed-slide should be arranged some distance apart, so that when one trigger pushes the shaft to one side it will present the other trigger in a position to be engaged by the next arm on the opposite side of the belt or chain.

The curved triggers P may be struck from a piece of suitable sheet metal—such as brass or the like—and turned or looped at their inner ends, as shown at $b$, to receive within them a link of the chain L, a bolt or stud $d$ being employed to secure said triggers to the links of the chain. The outer ends of these triggers taper, as shown, and by the construction described it is obvious that should any of the triggers become impaired it could be removed and be readily replaced by others at a trifling cost.

Having described my invention, what I claim is—

The combination, with a seed-planter and its seed-slide having lugs or triggers, of the endless chain L, the triggers P, tapering and curved outwardly and having their inner ends formed with an elongated loop $b$, and a perforation $a$ transversely through the loop, and the rivet or stud $d$, passing through the perforation in the loop and through links in the chain, so as to secure the triggers alternately on opposite sides of the chain, substantially as specified.

In testimony whereof I affix my signature in presence of two witnesses.

GEORGE J. CLINE.

Witnesses:
J. S. BLOOM,
ELIAS D. SALSRURY.